United States Patent
Gutmark et al.

(10) Patent No.: US 8,087,250 B2
(45) Date of Patent: Jan. 3, 2012

(54) DUPLEX TAB EXHAUST NOZZLE

(75) Inventors: Ephraim Jeff Gutmark, Cincinnati, OH (US); Steven (nmn) Martens, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 746 days.

(21) Appl. No.: 12/146,510

(22) Filed: Jun. 26, 2008

(65) Prior Publication Data

US 2009/0320486 A1 Dec. 31, 2009

(51) Int. Cl.
*F02K 1/00* (2006.01)

(52) U.S. Cl. ......... 60/770; 60/771; 60/262; 239/265.19; 239/265.27; 181/213

(58) Field of Classification Search .................... 60/770, 60/771, 262; 239/265.19, 265.27; 181/213
See application file for complete search history.

(56) References Cited

U.S. PATENT DOCUMENTS

| | | |
|---|---|---|
| 2,930,185 A | 3/1960 | Tyler |
| 2,956,400 A | 10/1960 | Antonio |
| 2,998,092 A | 8/1961 | Brown |
| 3,060,681 A | 10/1962 | Morley et al. |
| 3,065,818 A | 11/1962 | Lombard et al. |
| 3,092,205 A | 6/1963 | Brown et al. |
| 3,153,319 A | 10/1964 | Young et al. |
| 3,215,172 A | 11/1965 | Ardoin |
| 3,347,466 A | 10/1967 | Nichols |
| 3,455,413 A | 7/1969 | Henley |
| 3,557,830 A | 1/1971 | Raw |
| 3,568,792 A | 3/1971 | Urquhart |
| 3,613,996 A | 10/1971 | Tanner |
| 3,910,375 A | 10/1975 | Hache et al. |
| 3,982,696 A | 9/1976 | Gordon |
| 4,175,640 A * | 11/1979 | Birch et al. ................... 181/213 |
| 4,214,703 A | 7/1980 | Sorensen et al. |
| 4,217,756 A | 8/1980 | Laskody |
| 4,284,170 A | 8/1981 | Larson et al. |
| 4,298,089 A | 11/1981 | Birch et al. |
| 4,302,934 A | 12/1981 | Wynosky et al. |
| 4,401,269 A | 8/1983 | Eiler |
| 4,422,524 A | 12/1983 | Osborn |
| 4,487,017 A * | 12/1984 | Rodgers .......................... 60/262 |
| 4,543,784 A | 10/1985 | Kirker |
| 4,754,924 A | 7/1988 | Shannon |

(Continued)

FOREIGN PATENT DOCUMENTS

| | | |
|---|---|---|
| EP | 0619133 A1 | 10/1994 |
| EP | 1482160 A1 | 12/2004 |
| EP | 1873388 A1 | 1/2008 |
| EP | 1894616 A1 | 3/2008 |
| EP | 1995441 A2 | 11/2008 |

(Continued)

OTHER PUBLICATIONS

PCT/US2009/041239, Search Report and Written Opinion, Dec. 3, 2009.

*Primary Examiner* — William Rodriguez
*Assistant Examiner* — Steven Sutherland
(74) *Attorney, Agent, or Firm* — David J. Clement, Esq.; Trego, Hines & Ladenheim, PLLC

(57) ABSTRACT

An exhaust nozzle includes a conical duct terminating in an annular outlet. A row of vortex generating duplex tabs are mounted in the outlet. The tabs have compound radial and circumferential aft inclination inside the outlet for generating streamwise vortices for attenuating exhaust noise while reducing performance loss.

30 Claims, 5 Drawing Sheets

U.S. PATENT DOCUMENTS

| | | |
|---|---|---|
| 5,269,139 A | 12/1993 | Klees |
| 5,402,963 A | 4/1995 | Carey et al. |
| 5,771,681 A | 6/1998 | Rudlolf |
| 5,908,159 A | 6/1999 | Rudolf |
| 6,314,721 B1 | 11/2001 | Mathews et al. |
| 6,360,528 B1 | 3/2002 | Brausch et al. |
| 6,502,383 B1 | 1/2003 | Janardan et al. |
| 6,532,729 B2 | 3/2003 | Martens |
| 6,612,106 B2 | 9/2003 | Balzer |
| 7,093,423 B2 | 8/2006 | Gowda et al. |
| 7,305,817 B2 | 12/2007 | Blodgett et al. |
| 7,735,601 B1 | 6/2010 | Stieger et al. |
| 2006/0059891 A1 | 3/2006 | Sheoran et al. |
| 2008/0047273 A1 | 2/2008 | Au et al. |

FOREIGN PATENT DOCUMENTS

| | | |
|---|---|---|
| EP | 2072793 A2 | 6/2009 |
| EP | 2123894 A1 | 11/2009 |
| GB | 889688 A | 2/1962 |
| GB | 2082259 A | 3/1982 |
| GB | 2104967 A | 3/1983 |
| GB | 2146702 A | 4/1985 |
| GB | 2146702 A | 4/1985 |
| GB | 2207468 A | 2/1989 |
| GB | 2207468 A | 2/1989 |
| GB | 2289921 A | 12/1995 |
| JP | 2003172205 A | 6/2003 |

\* cited by examiner

DUPLEX TAB EXHAUST NOZZLE

The U.S. Government may have certain rights in this invention pursuant to contract number NAS3-01135 awarded by NASA.

BACKGROUND OF THE INVENTION

The present invention relates generally to gas turbine engines, and, more specifically, to noise attenuation therein.

In a turbofan gas turbine engine powering an aircraft in flight, air is pressurized in a compressor and mixed with fuel in a combustor for generating hot combustion gases. Energy is extracted from the gases in a high pressure turbine (HPT) which powers the compressor through one drive shaft.

Additional energy is extracted from the gases in a low pressure turbine (LPT) which powers the fan through another drive shaft. The spent combustion gases are then discharged through a core nozzle, and the pressurized fan flow is discharged through a surrounding fan nozzle for producing propulsion thrust during operation.

The core and fan exhausts are concentric with each other in the surrounding ambient air which flows outside the engine as the aircraft is propelled during flight.

The high velocity core and fan exhaust streams generate noise during operation, which is a particular problem during aircraft takeoff at high power which is in contrast with aircraft cruise at high altitude at correspondingly lower power output where noise is less of a problem but maximum engine efficiency is desired.

Noise attenuation mechanisms have been investigated for decades, but all have associated problems including corresponding additional weight in the aircraft and a reduction in engine efficiency or performance. In particular, since jet noise attenuation is typically required solely during aircraft takeoff from runways in populated communities, any noise attenuation mechanism is no longer required during the majority of flight operation during cruise. Cruise operation requires maximum engine efficiency for reducing fuel consumption.

Accordingly, it is desired to provide effective noise attenuation while minimizing engine performance and efficiency losses therefrom.

BRIEF DESCRIPTION OF THE INVENTION

An exhaust nozzle includes a duct terminating in an outlet. A row of vortex generating duplex tabs are mounted in the outlet. The tabs have compound radial and circumferential aft inclination inside the outlet for generating streamwise vortices for attenuating exhaust noise while reducing performance loss.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
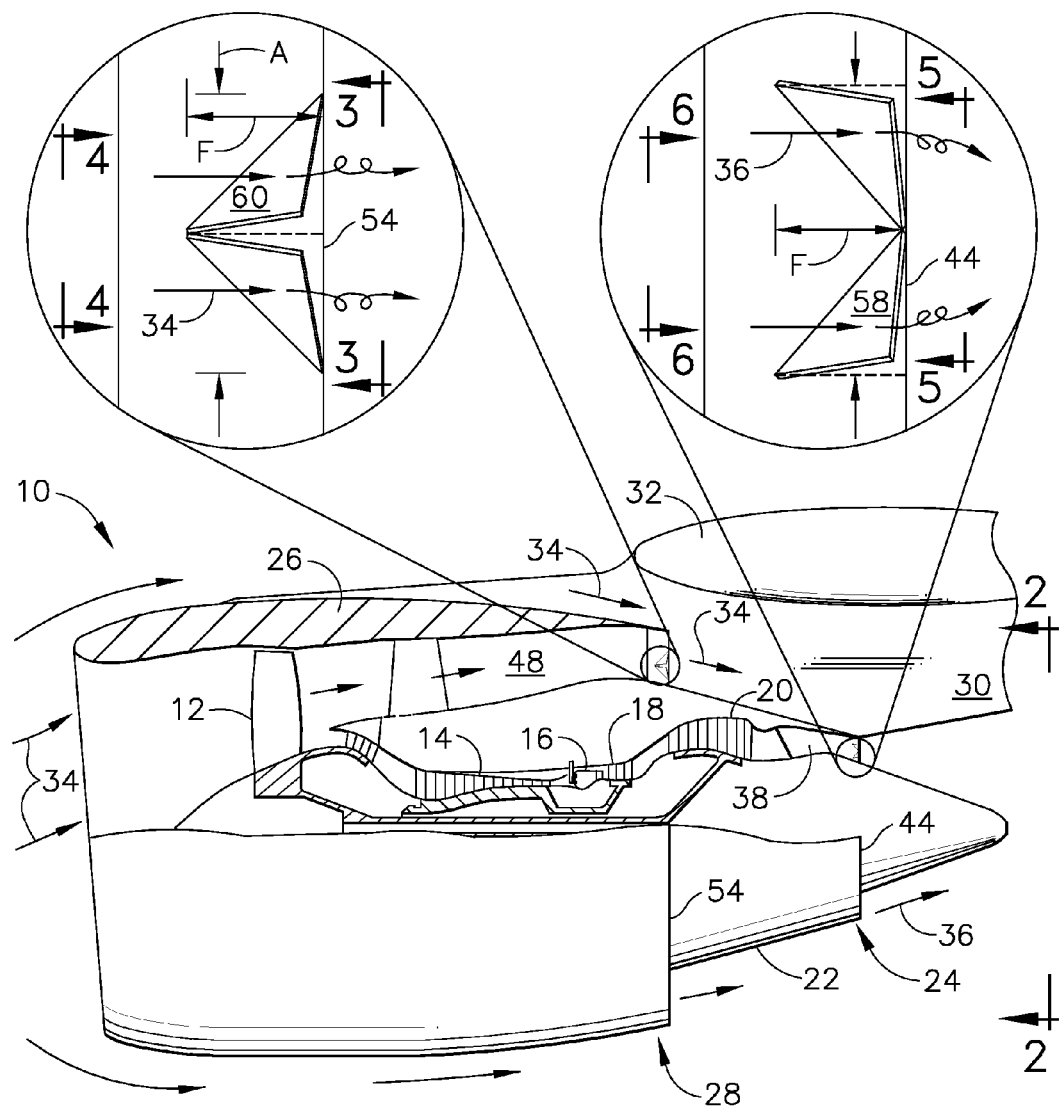
FIG. 1 is a partly sectional axial elevational view of an exemplary turbofan aircraft gas turbine engine having duplex tab vortex generators therein.

Illustrated schematically in FIG. 1 is an exemplary turbofan aircraft gas turbine engine 10 which is axisymmetrical about a longitudinal or axial centerline axis. The engine includes in serial flow communication a fan 12, compressor 14, combustor 16, high pressure turbine (HPT) 18, and low pressure turbine (LPT) 20.

An annular core cowl 22 surrounds the core engine aft of the fan and terminates in an annular core exhaust nozzle 24. An annular fan nacelle 26 surrounds the fan and the forward portion of the core cowl and terminates in an annular fan exhaust nozzle 28.

The engine is suitably mounted to an aircraft by a typical pylon 30 under the wing 32 for example.

During operation, air 34 enters the nacelle inlet and is pressurized by the rotating fan 12. An inner portion of the pressurized air enters the compressor 14 of the core engine for being further pressurized or compressed, and the outer portion of the fan air bypasses the core engine and is discharged through the fan exhaust nozzle 28 for producing a majority of the propulsion thrust.

The compressed air is mixed with fuel in the combustor 16 for generating hot combustion gases 36 which flow through the HPT 18 that powers the compressor 14 through one drive shaft. The combustion gases then flow through the LPT 20 which powers the fan 12 through another drive shaft, with the spent combustion gases 36 then being discharged through the core exhaust nozzle 24.

The engine 10 as described above is conventional in configuration and operation and produces high velocity fan and core exhaust streams 34,36 which are discharged from the corresponding fan and core exhaust nozzles 24,28 in concentric or confluent flow streams.

The high velocity fan and core exhaust 34,36 generate noise during operation which should be minimized in particular during takeoff operation of the aircraft from the runway. Accordingly, either the core nozzle 24 or fan nozzle 28, or both, may be modified to include noise attenuating features as disclosed in more detail below in exemplary embodiments.

The two exhaust nozzles 24,28 initially share common features for maximizing their aerodynamic performance during operation.

Figure 2:
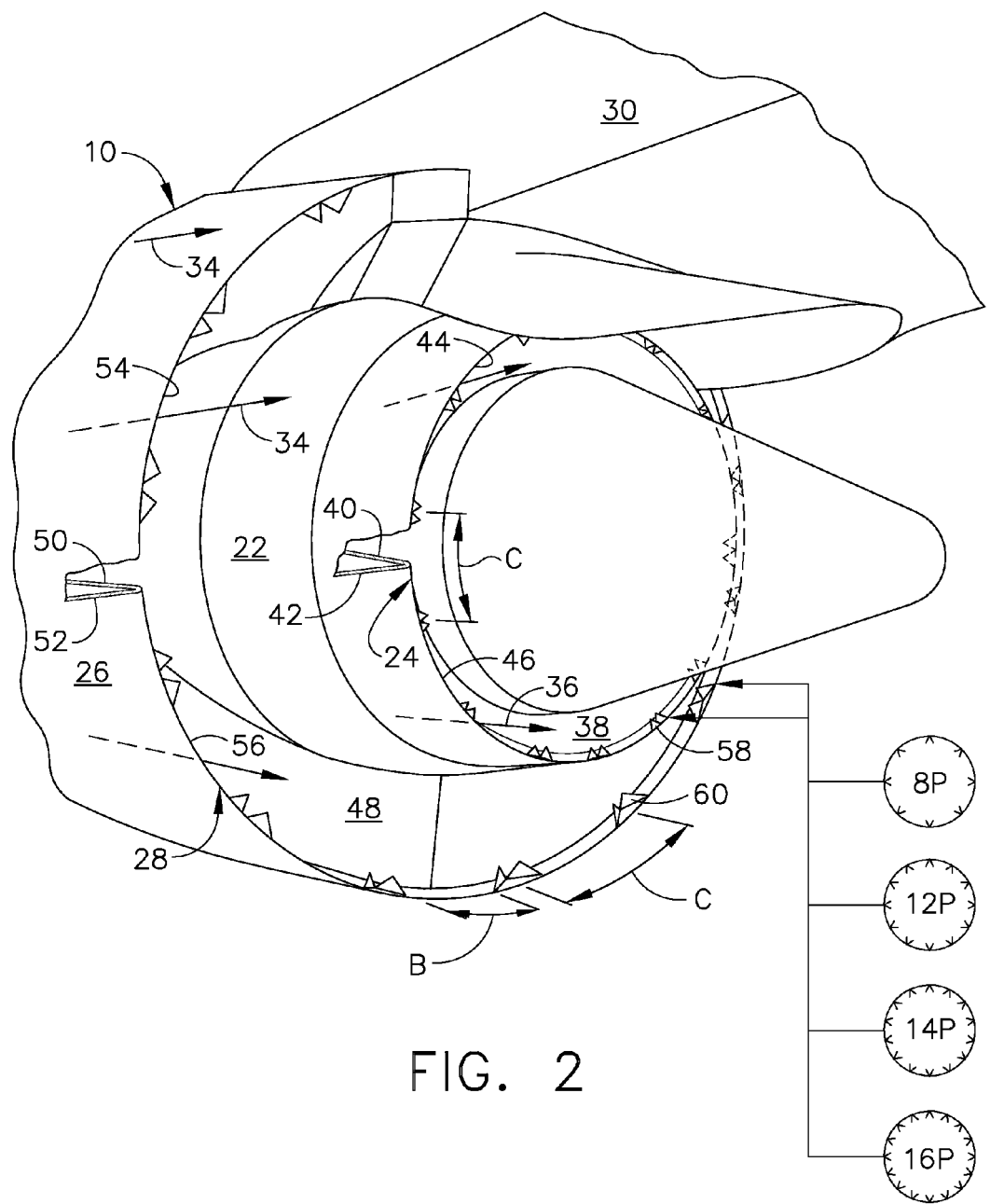
FIG. 2 is a rear elevational view of the fan and core exhaust nozzles of the engine illustrated in FIG. 1 and taken along line 2-2.

For example, the core nozzle 24 illustrated in FIG. 2 includes a conical exhaust duct 38 having radially inner and outer annular skins 40,42 which converge axially aft and terminate at a relatively thin or sharp trailing edge 44 surrounding an annular core outlet 46. These skins 40,42 are typically smooth sheet metal which converge together to the trailing edge 44. And, the exhaust duct 38 typically converges along the inner skin 40 to the core outlet 46 defined inside the trailing edge 44 at a single or common axial plane.

The core outlet 46 is defined by the surrounding annular or circular inner skin 40 at the trailing edge 44, and by a corresponding portion of an internal centerbody or plug projecting axially aft from the outlet.

The core nozzle 24 may have any conventional configuration and typically converges to a throat of minimum flow area at the trailing edge outlet 46, or slightly upstream therefrom as desired. The smooth annular inner and outer skins 44,42 terminate at the single axial plane core outlet 46 for maximizing engine efficiency in a conventional manner.

Correspondingly, the fan nozzle 28 includes a similar conical exhaust duct 48 having radially inner and outer annular skins 50,52 converging and terminating at a relatively sharp trailing edge 54 surrounding an annular outlet 56 for discharging the fan exhaust flow 34. The inner and outer skins 50,52 are typically smooth sheet metal and terminate in the single axial plane fan outlet 56 bound outwardly by the circular inner skin 50 and bound inwardly by a corresponding portion of the core cowl 22.

Like the core nozzle 24, the fan nozzle 28 typically converges to a throat of minimum flow area at the single plane trailing edge outlet 56, although the throat may be located upstream therefrom as desired.

The core nozzle 24 or the fan nozzle 28, or both, may be modified to include corresponding noise attenuating features in the form of corresponding duplex tabs 58,60, respectively, for generating streamwise vorticity to promote mixing at the corresponding shear layers between the high speed core exhaust 36 and surrounding fan exhaust 34, or between the high speed fan exhaust 34 and the surrounding ambient airflow over the fan nacelle.

The corresponding duplex tabs 58,60 are suitably mounted inside the corresponding core and fan ducts 38,48 and have compound radial and circumferential aft inclination therein for generating pairs of streamwise vortices to promote flow mixing and reduce flow velocity for attenuating noise with minimal pressure losses which would otherwise decrease engine efficiency and performance.

Two exemplary embodiments of the duplex tabs 58,60 are illustrated for the corresponding core and fan nozzles 24,28 and have similar features as described separately hereinbelow.

For example, the duplex tabs 58,60 are arranged in corresponding rows in the corresponding core and fan outlets 46,56 in single planes terminating at or near the corresponding trailing edges 44,54. In the core nozzle embodiment illustrated in FIGS. 5 and 6, the core duplex tabs 58 are substantially identical with each other and are arranged in circumferentially spaced apart pairs, with each pair having a common center slot 62 circumferentially therebetween. The two tabs 58 of each pair circumferentially adjoin each other at the inner skin 40, with the common center slot 62 extending radially inwardly from the common junction thereof.

Figure 3:
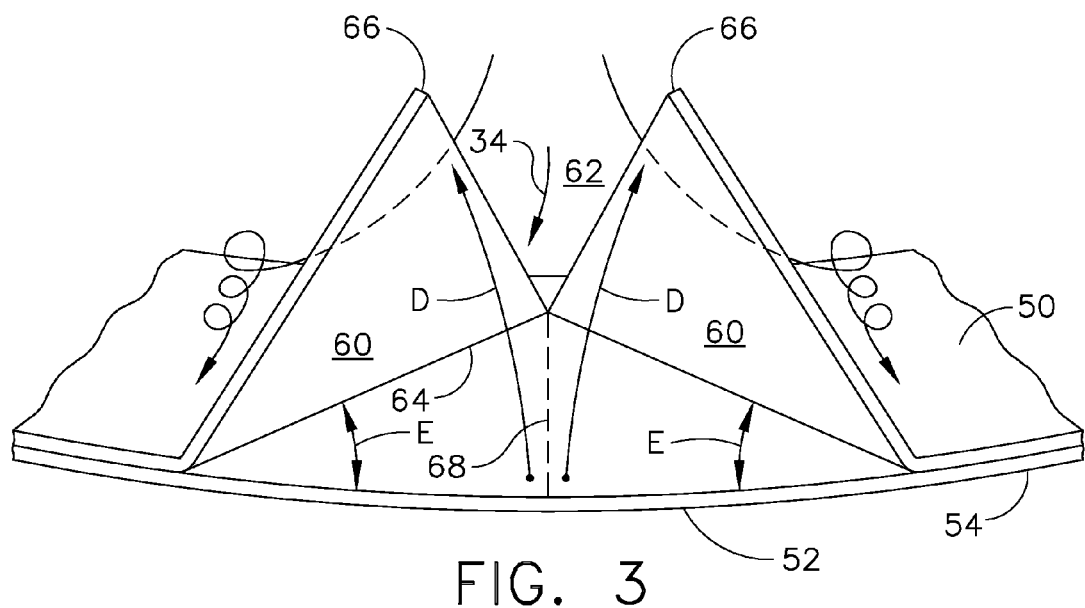
FIG. 3 is a rear elevational view of exemplary fan duplex tabs mounted in the fan nozzle illustrated in FIG. 1 and taken along line 3-3.
Figure 4:
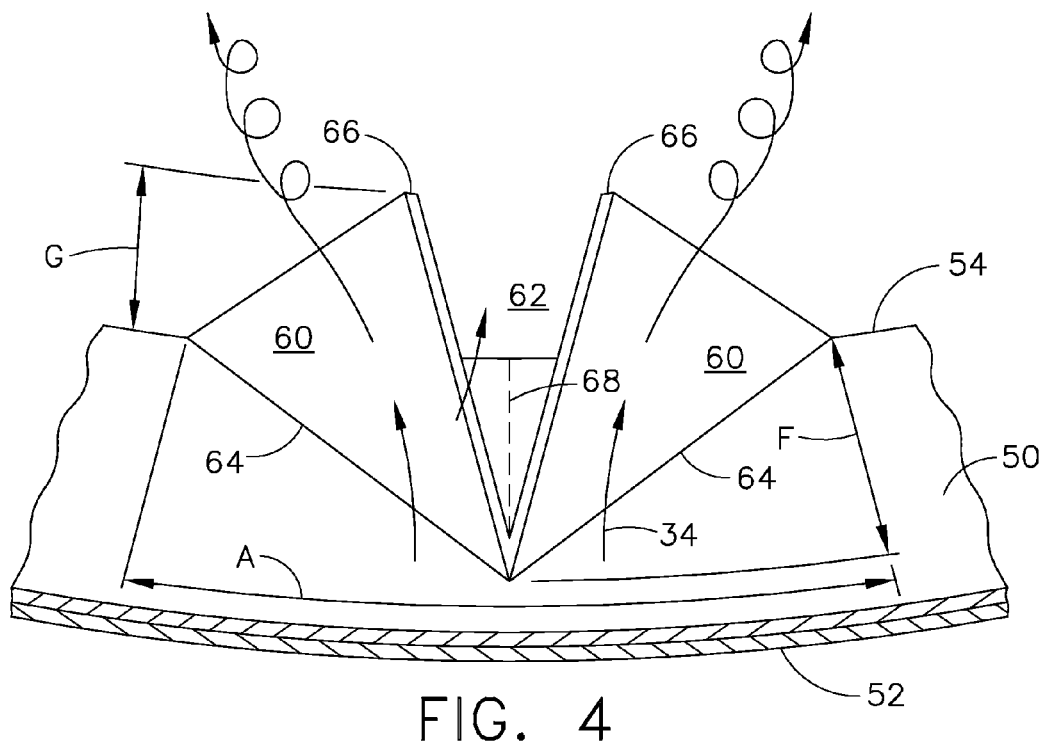
FIG. 4 is a forward elevational view of the fan duplex tabs illustrated in FIG. 1 and taken along line 4-4.

Similarly, the fan duplex tabs 60 of the fan nozzle embodiment illustrated in FIGS. 3 and 4 are also identical with each other and arranged in circumferentially spaced apart pairs with each pair also having a common center slot 62. The two tabs 60 in each pair circumferentially adjoin each other along the inner skin 50, and the common center slot 62 extends radially inwardly from the common junction thereof.

Figure 6:
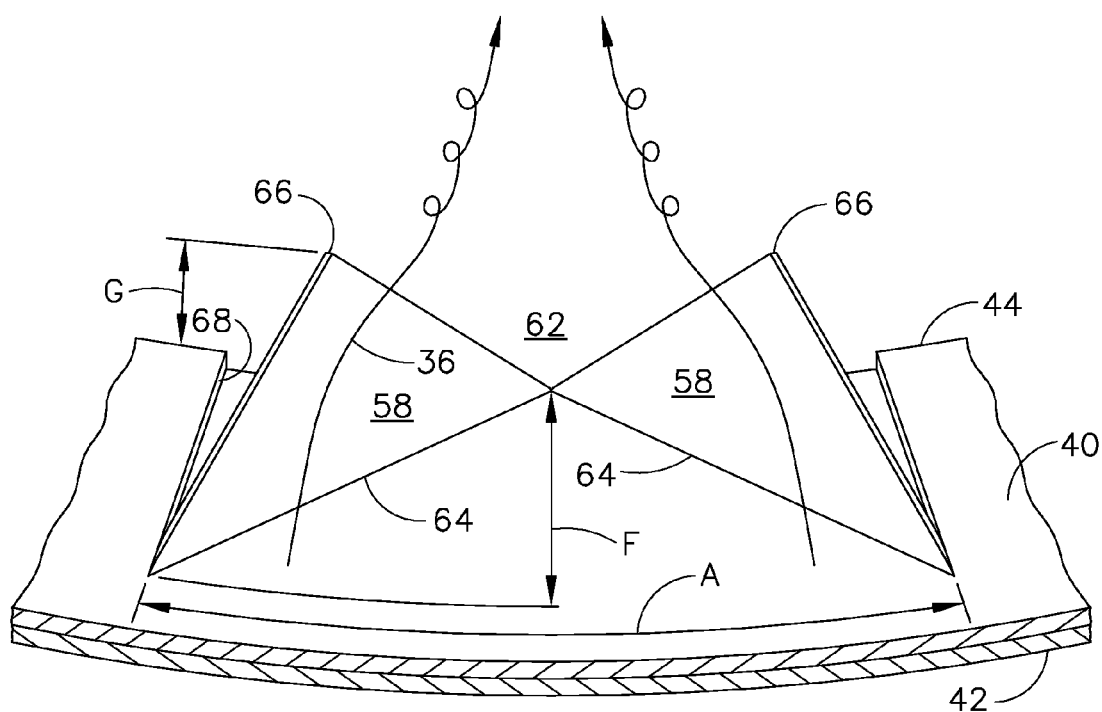
FIG. 6 is a forward elevational view of the core duplex tabs illustrated in FIG. 1 and taken along line 6-6.

As shown in FIGS. 4 and 6, each pair of tabs 58,60 has a collective circumferential tab width A, and as shown in FIG. 2, the corresponding tab pairs are circumferentially spaced apart from each other at a circumferential spacing B which is substantially greater than the corresponding tab width A for minimizing performance loss. The tab pairs are circumferentially spaced apart from each other at a corresponding angular spacing C which may be conveniently measured from center to center as defined at the corresponding center slots 62.

Figure 5:
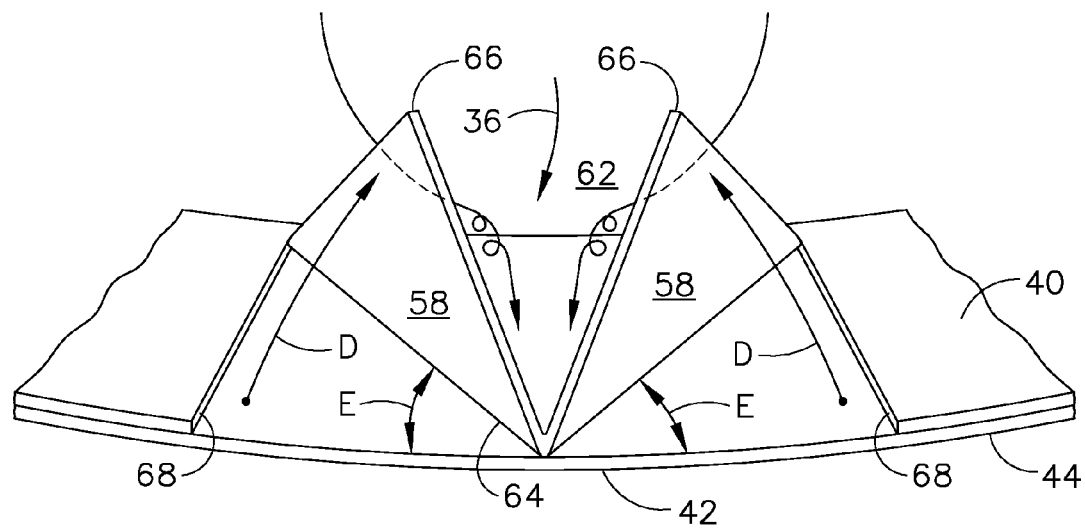
FIG. 5 is a rear elevational view of exemplary core duplex tabs in the core nozzle illustrated in FIG. 1 and taken along line 5-5.

The duplex tabs 58,60 have compound radial and circumferential inclination being inclined aft both radially and circumferentially toward the corresponding trailing edges 44,54. As shown in FIGS. 3 and 5, the corresponding tabs 58,60 are inclined radially inwardly at an acute radial inclination or penetration angle D toward the respective trailing edge outlets 46,56 to provide downstream ramps. The two tabs 58,60 are also circumferentially inclined at an acute skew angle E forwardly from the corresponding trailing edges 44,54.

The radial penetration angle D may be selected by suitable testing to maximize noise attenuation while minimizing pressure or performance losses. And in the different embodiments of the duplex tabs 58,60 illustrated in FIGS. 3 and 5, the penetration angle D is less than 90 degrees, and may be down to about 30 degrees, with a 50 degree penetration angle being preferred or optimal in one embodiment tested.

For example, it may be desirable to minimize the width of the slots 62 to minimize high frequency components of the jet noise in particular. And, the width of the slot 62 can be reduced by correspondingly decreasing the penetration angle D.

The skew angle E may also be selected for maximizing noise attenuation while minimizing pressure or performance losses, and in both embodiments illustrated in FIGS. 3 and 5 has an exemplary value of 45 degrees.

The duplex tabs 58,60 illustrated in FIGS. 3-6 also share similar roots 64 disposed along the corresponding inner skins 40,50 of the two ducts 38,48 and are preferably coextensive therewith. The duplex tabs 58,60 are inclined radially inwardly and axially aft from the corresponding roots 64 thereof to a respective apex 66.

As shown in FIGS. 3 and 5, the tab root 64 may commence at the corresponding trailing edges 44,54 and is inclined circumferentially forwardly therefrom at the corresponding skew angle E. The roots therefore extend axially aft and define the maximum axial length F of the individual tabs 58,60.

Correspondingly, the individual tabs 58,60 are inclined radially inwardly at the penetration angle D to define the maximum radial height and penetration G of the individual tabs.

Accordingly, the circumferential width A, penetration angle D, skew angle E, axial length F, and corresponding penetration depth G may be selected during engine development for maximizing noise attenuation while minimizing performance loss. Noise attenuation is effected by the generation of streamwise vortices shown schematically in corresponding pairs in FIGS. 3-6 which promote mixing of the different speed flowstreams along the inter-stream shear layers.

The duplex tabs 58,60 may have various embodiments for various advantages in meeting the goals of efficient noise attenuation while minimizing performance loss.

For example, each of the duplex tabs 58,60 is preferably triangular in one embodiment and formed of relatively thin and constant thickness sheet metal having sufficient strength for withstanding the aerodynamic pressure loading thereon during operation in the corresponding core and fan nozzles 24,28.

Each triangular tab 58,60 therefore effects an inclined delta wing for generating corresponding vortices in the high velocity fluid flow thereover during operation. And, the common slot 62 between the adjoining duplex tabs 58,60 is also triangular and extends outwardly from the common junction of the corresponding tab roots 64. The exhaust flow is therefore impeded by the individual tabs 58,60 themselves while freely flowing around the triangular perimeters thereof and through the common slots 62.

In the preferred embodiments illustrated in FIGS. 3-6, the duplex tabs 58,60 are identical in size and configuration in each row, and are symmetrical about the common center slots 62 between each tab pair for promoting symmetrical vortices therefrom.

The otherwise identical duplex tabs 58,60 in these two different embodiments have different orientations or skew to effect correspondingly different performance.

For example, the core duplex tabs 58 in the core nozzle embodiment illustrated in FIGS. 5 and 6 converge together in the axially downstream direction toward the common center slots 62 thereof terminating at the trailing edge 44. The core duplex tabs 58 are perpendicular or normal to each other at the intersecting roots 64 thereof and therefore have a 90 degree included angle. The corresponding skew angle E is therefore 45 degrees aft from the trailing edge 44 from the common center junction of the two roots 64.

In this core configuration, the core duplex tabs 58 individually define triangular delta wings, and are collectively arranged in an aft facing or pointing chevron or double-deltoid profile having aft-converging wings.

In contrast, the fan duplex tabs 60 for the fan nozzle embodiment illustrated in FIGS. 3 and 4 circumferentially diverge apart in each pair from the common center slots 62 thereof axially aft toward the trailing edge 54. In this embodiment, the duplex tabs 60 are again normal or perpendicular to each other at the intersecting roots 64 at a 90 degree included angle. Correspondingly, the skew angles E are again 45 degrees axially aft from the trailing edge 54.

In this fan configuration, the fan duplex tabs 60 again individually define triangular delta wings, but are collectively arranged in a forward facing or pointing chevron or double-deltoid profile having aft-diverging wings.

In FIG. 3, the 90 degree included angle between the two tabs 60 faces axially aft to create a base triangle facing forwardly, with leading edges of the tabs 60 bounding the forwardly located center slots 62 shown in FIG. 4.

In FIG. 6, the 90 degree included angle of the two tabs 58 faces axially forwardly to define a base triangle projecting axially aft, with the center slots 62 being bound by trailing edges of the tabs 58.

Accordingly, the core duplex tabs 58 collectively form an aft pointing chevron, with the two wing tabs 58 spreading laterally in mushroom fashion to the aft apex point. In contrast, the fan duplex tabes 60 collectively form a forward pointing chevron wing, with the two wing tabs 60 being tapered like an arrowhead or delta wing to the forward apex point.

Although the mushroom and delta configurations of the duplex tabs share common features and ability to promote noise attenuation mixing of the corresponding flow streams, these two configurations also effect different performance.

For example, the pairs of streamwise vortices generated by these different configurations will rotate opposite to each other. These different vortices will bias the fan exhaust 34 radially outwardly from the fan nozzle 28 at the delta tabs 60, and bias the core exhaust 36 radially inwardly from the core nozzle 24 at the mushroom tabs 58, and the bias will be opposite circumferentially between the corresponding tab pairs.

In the two embodiments illustrated in FIGS. 3-6, the duplex tabs 58,60 have a common axial length F, and the collective width A thereof is twice the length F. This configuration has additional advantages.

For example, the tab pairs 58 in FIGS. 5 and 6 and the tab pairs 60 in FIGS. 3 and 4 may be initially formed from a common piece of sheet metal slit and bent to shape. In FIGS. 5 and 6, two end slits 68 of axial length F may be cut from the trailing edge at a circumferential spacing A therebetween to provide a rectangular perimeter. The two tabs 58 may then be bent outwardly from their corresponding roots 64 to achieve the desired penetration angles D.

Similarly, a single middle slit 68 of axial length F may be formed from the trailing edge of the initially flat sheet metal, and then the two tabs 60 may be bent outwardly from the corresponding roots 64 within the bounding rectangular perimeter to the desired penetration angle D.

This simple manufacturing method for deploying the individual tabs 58,60 to the desired compound inclination thereof also permits further developments in actuation thereof. In subsequent development, it may be advantageous to fully retract flat the duplex tabs 58,60 coextensively into the inner skin 40,50, while deploying the tabs 58,60 only during takeoff operation.

The roots 64 may be modified to form corresponding hinges, with the tabs 58,60 being suitably actuated between retracted and deployed positions. Retracting the tabs flush into the inner skins of the corresponding exhaust nozzles will eliminate the performance loss due to the deployed tabs for maximizing engine efficiency and performance, and in particular during cruise operation of the aircraft.

However, it may be advantageous to maintain the duplex tabs deployed during aircraft cruise operation. For example, the fan exhaust may have supersonic velocity at cruise which will generate broadband shock noise that can be attenuated by the duplex tabs.

Nevertheless, the relatively small configurations of the duplex tabs 58,60 minimize performance losses when deployed while achieving the desired noise attenuation therefrom. The individual tabs have a relatively small aspect ratio defined by the radial penetration G over the length of the tab root 64, which aspect ratio may be about 0.6 for example.

Correspondingly, the duplex tabs 58,60 have a corresponding radially inward core stream penetration in the corresponding exhaust outlets 46,56. That stream penetration may be defined by the ratio of the penetration depth G over the radial height of the exhaust outlet. And, that penetration is controlled by the size of the tabs 58,60 and their penetration angles D. In exemplary embodiments tested, the penetration ratio may be up to about 25 percent of the outlet annulus height.

A particular advantage of the small duplex tabs 58,60 is their original, or retrofit, introduction into an otherwise conventional and aerodynamically efficient converging exhaust nozzle such as the core nozzle 24 or fan nozzle 28. These nozzles have substantially annular or round outlets 46,56 bounded by a single plane circular trailing edge 44,54.

Furthermore, the duplex tabs could also be used on other types of conventional exhaust nozzles, including converging-diverging, variable area exhaust nozzles at or near the nozzle outlets thereof.

The duplex tabs 58,60 may be suitably mounted wholly inside the corresponding nozzles 24,28 and either terminate at the corresponding trailing edges 44,54, or slightly upstream or downstream therefrom as desired. And, either type of tab 58,60 may be used in either nozzle 24,28 as desired.

In both embodiments illustrated in FIG. 2, the duplex tabs 58,60 are preferably equiangularly spaced apart at the center-to-center spacing angle C in corresponding pairs around the respective nozzle outlets 46,56. As indicated above, the circumferential spacing B between adjacent pairs of duplex tabs is substantially greater than the collective circumferential width A of each tab pair, and may be about two to three times as great.

Furthermore, testing of various embodiments of the duplex tabs indicates enhanced noise attenuation when the tabs are preferably arranged in even numbers or pluralities of pairs around the corresponding nozzle outlets, in the preferred range of eight to sixteen pairs, with 8, 12, 14, and 16 pairs (8 P-16 P) being tested.

As indicated above, the duplex tabs may have various possible configurations, further including odd as well as even numbers thereof; unequal as well as equal circumferential spacing; and unequal as well as equal size, geometry, and position around the circumference of the exhaust nozzle as desired to maximize noise attenuation while minimizing aerodynamic performance losses.

Figure 7:
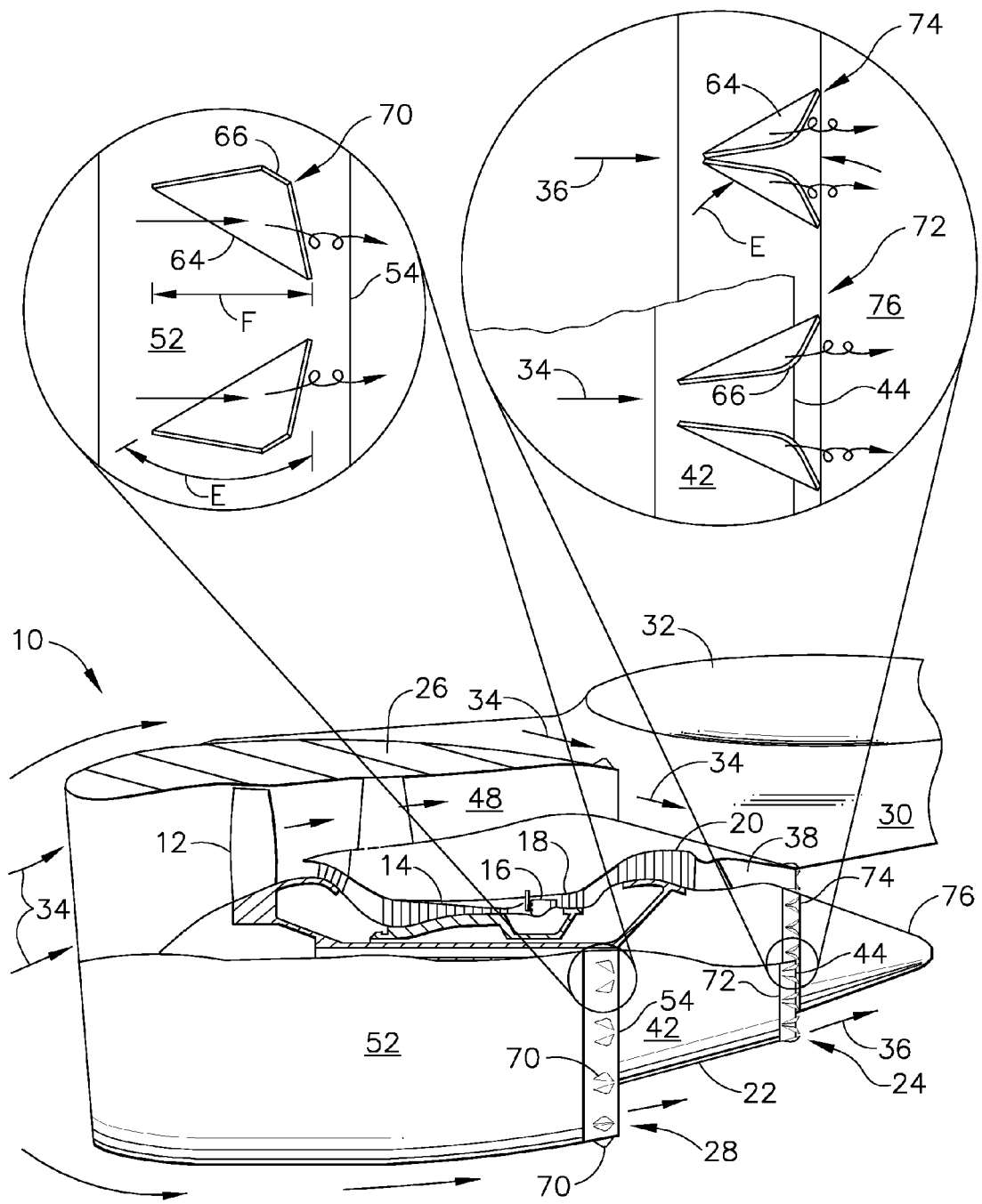
FIG. 7 is a partly sectional axial elevational view of the turbofan engine shown in FIG. 1 having additional embodiments of the duplex tabs therein.

FIG. 7 illustrates three additional embodiments of the duplex tabs 70,72,74 which share the common feature of extending radially outwardly at the corresponding nozzles 24,28, in an opposite direction than the duplex tabs 58,60 shown in FIGS. 1-6 which extend radially inwardly thereat.

In FIG. 2, the duplex tabs 58,60 extend radially inwardly from the inner skins 40,50 inside the corresponding exhaust outlets 46,56.

In FIG. 7, the duplex fan tabs 70 extend radially outwardly from the outer skin 52 of the fan nacelle 26 outside the fan outlet. The core duplex tabs 72 extend radially outwardly from the outer skin 42 of the core cowl 22 outside the core outlet.

And, an additional set of core duplex tabs 74 extends radially outwardly from the outer skin of a centerbody 76 disposed concentrically inside the outlet of the core nozzle 24. The centerbody 76 bounds the core outlet radially inwardly in the same manner that the core cowl 22 bounds the fan outlet radially inwardly to form corresponding annuluses through which the exhaust streams are discharged.

The various duplex tabs may therefore extend radially inside or outside the respective exhaust outlets from either the inner or outer boundaries thereof to generate the vortex pairs which promote mixing of the concentric flowstreams for noise attenuation.

A single row or set of the duplex tabs may be used at any one or more exhaust outlets, and it is also possible to mount two sets of duplex tabs at each exhaust outlet extending both radially inwardly and outwardly where pressure losses do not exceed noise attenuation advantages.

FIG. 7 also illustrates the different types of duplex tabs which may be alternatively used at the different outlets based on the particular engine size and operating cycle. Whereas the delta tabs 60 are shown for the fan nozzle 28 in FIG. 1, the mushroom tabs 70 are instead used for the fan nozzle 28 in FIG. 7, and extend outwardly from the fan nacelle 26.

Whereas the mushroom tabs 58 are shown for the core nozzle 24 in FIG. 1, the delta tabs 72 are instead used for the core nozzle 24 in FIG. 7, and extend outwardly from the core cowl 22.

And, a second set of delta tabs 74 is also used for the core nozzle 24 in FIG. 7, and extends outwardly from the centerbody 76.

These various configurations are shown in the figures as an expedient of presentation only, and actual use of the various duplex tabs will depend on actual engine design and aerodynamic cycles.

Another feature of the duplex tabs which may be varied is the axial position thereof relative to the corresponding trailing edges 44,54.

Whereas the duplex tabs 58,60 shown in FIG. 1 terminate at the respective trailing edges 44,54 of the nozzles, the duplex tabs may alternatively terminate axially forward or aft of those trailing edges as shown in FIG. 7.

For example, the duplex tabs 70 terminate axially forward of the trailing edge 54, with an axial spacing therefrom of up to about two axial tab lengths (2F) for maintaining mixing performance.

In contrast, the duplex tabs 72,74 may terminate axially aft of the trailing edge 44 by up to about one axial tab length (F) for maintaining mixing performance. In this embodiment, the outer core tabs 72 are cantilevered in part aft from the outer skin 42, whereas the inner core tabs 74 are fully supported atop the centerbody 76.

As indicated above for FIGS. 3 and 5, both the radial penetration angle D and the circumferential skew angle E can be varied to maximize performance, with the skew angle E shown in FIG. 7 having a larger value of about 60 degrees which correspondingly narrows the circumferential width of the tabs and reduces their flow obstruction.

In this configuration, the duplex tabs 70,72,74 are acute to each other at the roots 64 thereof, instead of normal in the previous embodiments. The two tabs in each pair have a shallower, or acute included angle of also 60 degrees in the symmetrical embodiments shown in FIG. 7 for minimizing upstream surface area, while still effectively shedding the vortex pairs.

In FIG. 1, the inclined roots 64 of the duplex tabs 58,60 intersect each other at a common point or junction in each duplex pair, at which junction the center slot 62 commences.

In FIG. 7, the inclined roots 64 of the duplex tabs 70,72 converge toward each other in each duplex pair, but do not intersect. The tabs remain spaced apart circumferentially at the common slots where they are closest together, which is at the trailing ends for the tabs 70, and at the leading ends for the tabs 72.

This minimum circumferential spacing between the tabs in each pair at their bases or roots 64 may be up to about twice the circumferential width of each tab for maintaining the aerodynamic cooperation of the pair of counterrotating vortices shed from the tab pairs.

The duplex tabs 58,60 shown in FIG. 1 are axially symmetrical, and converge from the roots 64 to the apexes 66, which apexes may be relatively sharp with small radius bullnoses.

In contrast, the duplex tabs 70 shown in FIG. 7 are truncated in radial penetration at the apexes 66, which apexes provide flat chords in the correspondingly truncated triangular, or trapezoidal, configurations. And, the apexes 66 of the tabs 72,74 may have larger radius bullnoses.

The various duplex tabs include two lateral edges each, one providing a leading end over which the exhaust first flows, and the other edge providing a trailing end over which the exhaust flow is shed in the cooperating vortices around the common center slot therebetween.

In alternate embodiments, the triangular profiles of the duplex tabs may be further modified to include nonsymmetrical configurations in which the lengths of the leading and trailing ends may be varied as required for best cooperating with the aerodynamic variations in the exhaust flow around the perimeter of the corresponding nozzles, and with the differences in aerodynamic performance of the pressured fan air 34 and the expanding combustion gas flow 36.

Accordingly, by the introduction of relatively simple and small duplex tabs at the exhaust outlets 46,56 significant noise attenuation may be obtained with relatively small performance loss. The duplex tabs may have various configurations represented by various permutations of the various features described above as examples. And, the small tab configuration promotes active deployment and retraction of the tabs in further development thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. An exhaust nozzle comprising a conical duct terminating in an annular outlet including a row of duplex tabs having compound radial and circumferential aft inclination from root to apex and between forward and aft edges with a diverging common center slot circumferentially therebetween.

2. A nozzle according to claim 1 wherein said duplex tabs are arranged in circumferentially spaced apart pairs with each pair having said common center slot circumferentially between adjacent tabs.

3. A nozzle according to claim 2 wherein said duct terminates at an annular trailing edge surrounding said outlet, and said duplex tabs are inclined both radially and circumferentially toward said trailing edge.

4. A nozzle according to claim 3 wherein each duplex tab includes a circumferentially inclined root along said outlet and is inclined radially aft from said root to said apex of said tab.

5. A nozzle according to claim 4 wherein said duplex tabs are symmetrical about said common slot therebetween.

6. A nozzle according to claim 4 wherein said duplex tabs circumferentially diverge from said common slot toward said trailing edge.

7. A nozzle according to claim 4 wherein said duplex tabs circumferentially converge toward said common slot at said trailing edge.

8. A nozzle according to claim 4 wherein said duplex tabs extend radially inside said outlet.

9. A nozzle according to claim 4 wherein said duplex tabs extend radially outside said outlet.

10. A nozzle according to claim 4 wherein said duplex tabs and common slots thereof are triangular.

11. An exhaust nozzle comprising:
a conical exhaust duct having radially inner and outer skins terminating at a trailing edge surrounding an outlet for discharging exhaust flow; and
a row of adjoining duplex tabs having a common slot therebetween, with each tab inclined radially from said duct at an acute radial inclination angle at said outlet around said trailing edge and said slot diverges radially from said duct, wherein said duplex tabs are arranged in pairs, each pair having a collective tab width, and said tab pairs are circumferentially spaced apart from each other at a greater spacing than said tab width, and wherein said duplex tabs are inclined both radially aft toward said outlet and circumferentially forward from said trailing edge.

12. A nozzle according to claim 11 wherein each duplex tab includes a root circumferentially inclined forwardly from said trailing edge, and an apex spaced radially from said root.

13. A nozzle according to claim 12 wherein each duplex tab is triangular and defines an inclined delta wing for generating vortices in flow thereover, and said common slot therebetween is also triangular and extends outwardly from a common junction of said tab roots.

14. A nozzle according to claim 12 wherein said duplex tabs are symmetrical about said common slot therebetween.

15. A nozzle according to claim 12 wherein said duplex tabs circumferentially diverge from said common slot toward said trailing edge.

16. A nozzle according to claim 12 wherein said duplex tabs circumferentially converge toward said common slot at said trailing edge.

17. A nozzle according to claim 12 wherein said duplex tabs are normal to each other at said roots.

18. A nozzle according to claim 12 wherein said duplex tabs are acute to each other at said roots.

19. A nozzle according to claim 12 wherein said inclined roots intersect each other at a common point in each duplex pair.

20. A nozzle according to claim 12 wherein said inclined roots converge toward each other in each duplex pair and remain spaced apart at said common slot.

21. A nozzle according to claim 12 wherein said duplex tabs have a common axial length, and said collective width thereof is twice said length.

22. A nozzle according to claim 12 wherein said duplex tabs terminate at said trailing edge.

23. A nozzle according to claim 12 wherein said duplex tabs terminate axially forward of said trailing edge.

24. A nozzle according to claim 12 wherein said duplex tabs terminate axially aft of said trailing edge.

25. A nozzle according to claim 12 wherein said duplex tabs are equiangularly spaced apart in corresponding pairs around said nozzle outlet.

26. A nozzle according to claim 12 wherein said duplex tabs converge from said roots to said apexes.

27. A nozzle according to claim 12 wherein said duplex tabs are truncated at said apexes.

28. A nozzle according to claim 12 wherein said duplex tabs extend radially inwardly from said inner skin inside said exhaust outlet.

29. A nozzle according to claim 12 wherein said duplex tabs extend radially outwardly from said outer skin outside said exhaust outlet.

30. A nozzle according to claim 12 wherein said exhaust duct includes a centerbody disposed concentrically therein and bounding said exhaust outlet radially inwardly, and said duplex tabs extend radially outwardly from said centerbody inside said outlet.

* * * * *